(12) United States Patent
Teng et al.

(10) Patent No.: US 8,531,129 B2
(45) Date of Patent: Sep. 10, 2013

(54) PASSIVE CURRENT BALANCE DRIVING APPARATUS

(75) Inventors: Chih-Jen Teng, Taipei County (TW); Wen-Sen Hsieh, Taoyuan County (TW)

(73) Assignee: FSP Technology Inc., Taoyuan County (TW)

( * ) Notice: Subject to any disclaimer, the term of this patent is extended or adjusted under 35 U.S.C. 154(b) by 301 days.

(21) Appl. No.: 12/832,980

(22) Filed: Jul. 8, 2010

(65) Prior Publication Data

US 2012/0007513 A1    Jan. 12, 2012

(51) Int. Cl.
*H05B 37/02* (2006.01)

(52) U.S. Cl.
USPC ............ 315/297; 315/294; 315/291; 315/308

(58) Field of Classification Search
USPC ................ 315/246, 250, 291, 294, 297, 307, 315/185 R
See application file for complete search history.

(56) References Cited

U.S. PATENT DOCUMENTS

| | | | |
|---|---|---|---|
| 7,573,729 B2* | 8/2009 | Elferich et al. | 363/21.02 |
| 8,120,278 B2* | 2/2012 | Choi et al. | 315/294 |
| 2006/0255753 A1* | 11/2006 | Sawada et al. | 315/312 |
| 2006/0284569 A1* | 12/2006 | Wey et al. | 315/282 |
| 2010/0253665 A1* | 10/2010 | Choi et al. | 345/211 |
| 2010/0295471 A1* | 11/2010 | Ishikura et al. | 315/294 |
| 2011/0006605 A1* | 1/2011 | Chang et al. | 307/31 |
| 2011/0075057 A1* | 3/2011 | Kim et al. | 348/790 |
| 2011/0156615 A1* | 6/2011 | Chang et al. | 315/297 |

FOREIGN PATENT DOCUMENTS

| | | |
|---|---|---|
| CN | 101147203 | 3/2008 |
| TW | 200517014 | 5/2005 |
| TW | I310246 | 5/2009 |

OTHER PUBLICATIONS

"Office Action of Taiwan Counterpart Application", issued on Mar. 4, 2013, p1-p6.

* cited by examiner

*Primary Examiner* — Douglas W Owens
*Assistant Examiner* — Amy Yang
(74) *Attorney, Agent, or Firm* — Jianq Chyun IP Office

(57) ABSTRACT

A passive current balance driving apparatus has a circuit topology composed by several simple passive components and is capable of driving a plurality of LED strings simultaneously. The present passive current balance driving apparatus is mainly configured such that each LED string has the identical load characteristics during the positive and negative half cycles of the AC power. As such, the currents flowing through the respective LED strings are basically/substantially equal, thereby achieving the current balance.

8 Claims, 4 Drawing Sheets

US 8,531,129 B2

PASSIVE CURRENT BALANCE DRIVING APPARATUS

BACKGROUND OF THE INVENTION

1. Field of the Invention

The present invention relates to a current balance technology, and more particularly, to a passive current balance driving apparatus.

2. Description of Related Art

Following the vigorous development in semiconductor technology, portable electronics and flat display products have become popular in recent years. Among various types of flat displays, liquid crystal displays (LCD) have become the main stream products due to its low voltage operation, no radiation, light weight and small size. In general, since an LCD panel itself does not emit light, a backlight module must be disposed below the LCD panel to provide a light source for the LCD panel.

There are generally two types of conventional backlight modules, one of which is the backlight module formed by cold cathode fluorescent lamps (CCFLs), and the other of which is the backlight module formed by light emitting diodes (LEDs). Since the LED backlight module can increase the color gamut of the LCD display, the majority of current panel vendors have replaced the CCFL backlight module with the LED backlight module.

The LED backlight module includes a plurality of LED strings arranged in parallel. Each of LED strings includes a plurality of LEDs connected in series. In practice, a DC-DC converter is generally used to convert a DC power into a DC voltage which is capable of driving the LED strings simultaneously. However, each of the LED stings may have a different load characteristics and, therefore, it can be inferred that the current flowing through each LED string is different (i.e. current unbalance), thereby resulting in a non-uniform luminance of the light source provided for the LCD panel by the LED backlight module.

In order to solve such problem, a current balance control circuit may be added into the LED backlight module to regulate the current flowing through each LED string, such that the currents flowing through the LED strings may be equal (e.g. current balance). A typical current balance control circuit may be a current mirror circuit formed by a plurality of active elements (e.g. MOSFET) or a current feedback compensation circuit. In addition, the current balance control circuit may be formed by a ready-made current regulation chip (e.g. current sink IC).

However, for semiconductor devices such as the MOSFET, the characteristic curve of the drain current (Id) and the gate-source voltage (Vgs) may be different due to the process variation. Therefore, regulating the current flowing through each LED string using the current mirror circuit formed by MOSFET or the current feedback compensation circuit can have only a limited accuracy.

In addition, the number of regulation channels of the ready-made current regulation chip is usually fixed (usually four or six regulation channels) and one regulation channel is used to regulate the current flowing through one LED string. Therefore, when the LED backlight module has, for example, ten LED strings, it must use three current regulation chips each having four regulation channels or two current regulation chips each having six regulation channels. It wastes two unused regulation channels whichever configuration is selected, thus undoubtedly creating excessive cost.

SUMMARY OF THE INVENTION

Accordingly, the present invention is directed to a passive current balance driving apparatus which has a circuit topology that can be formed simply by several simple passive elements and is configured such that the passive current balance driving apparatus can drive a plurality of LED strings simultaneously and achieve a substantially identical current flowing through each LED string.

The passive current balance driving apparatus provided by the present invention includes a transformer, a capacitor and first to fourth diodes. The transformer includes a primary side and a secondary side. The primary side is adapted to receive an alternative current (AC) power. A first terminal of the capacitor is coupled to a first terminal of the secondary side. A cathode of the first diode is coupled to a second terminal of the capacitor, and an anode of the first diode is coupled to a reference potential. An anode of the second diode is coupled to the second terminal of the capacitor, and a cathode of the second diode is coupled to the reference potential through a first light emitting diode (LED) string. A cathode of the third diode is coupled to the second terminal of the secondary side, and an anode of the third diode is coupled to the reference potential. An anode of the fourth diode is coupled to the second terminal of the secondary side, and a cathode of the fourth diode is coupled to the reference potential through a second LED string.

In one embodiment of the present invention, the anode of the first diode is further coupled to the reference potential through a third LED string; and the anode of the third diode is further coupled to the reference potential through a fourth LED string.

In one embodiment of the present invention, the secondary side of the transformer may include a first sub-secondary side and a second sub-secondary side. A first terminal of the first sub-secondary side is used to be served as the first terminal of the secondary side, and a second terminal of the second sub-secondary side is used to be served as the second terminal of the secondary side. With this construction, a second terminal of the first sub-secondary side and a first terminal of the second sub-secondary side may be coupled to each other or may not be coupled to each other.

In one embodiment of the present invention, when the second terminal of the first sub-secondary side and the first terminal of the second sub-secondary side are not coupled to each other, the passive current balance driving apparatus of the present invention may further comprise fifth to eighth diodes. An anode of the fifth diode is coupled to the first terminal of the second sub-secondary side. An anode of the sixth diode is coupled to a cathode of the fifth diode through a fifth LED string, and a cathode of the sixth diode is coupled to the second terminal of the first sub-secondary side. A cathode of the seventh diode is coupled to the first terminal of the second sub-secondary side. An anode of the eighth diode is coupled to the second terminal of the first sub-secondary side, and a cathode of the eighth diode is coupled to an anode of the seventh diode through a sixth LED string.

In one embodiment of the present invention, the primary side may include a first sub-primary side and a second sub-primary side, the first sub-primary side and the first sub-secondary side may be formed as a first sub-transformer of the transformer, and the second sub-primary side and the second sub-secondary side may be formed as a second sub-transformer of the transformer. With this construction, the first sub-primary side and the second sub-primary side can be used to receive the AC power, respectively.

In view of the forgoing, the present passive current balance driving apparatus is mainly configured such that each LED string has the identical load characteristics during the positive and negative half cycles of the AC power. As such, the currents flowing through the respective LED strings are basically/substantially equal, thereby achieving the current balance.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
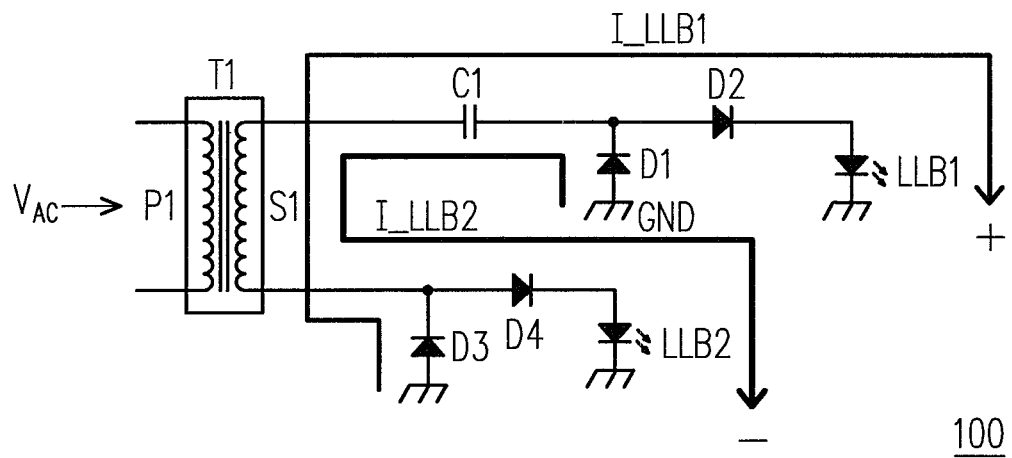
FIG. 1 illustrates a circuit of a passive current balance driving apparatus according to a first embodiment of the present invention.

Reference will now be made in detail to the exemplary embodiments of the present invention, examples of which are illustrated in the accompanying drawings. Wherever possible, like reference numerals denote like elements throughout the specification.

FIG. 1 illustrates a circuit of a passive current balance driving apparatus 100 according to a first embodiment of the present invention. Referring to FIG. 1, the passive current balance driving apparatus 100 includes a transformer T1, a capacitor C1 and first to fourth diodes D1-D4. In the first embodiment, the transformer T1 includes a primary side P1 and a secondary side S1. The primary side P1 is used to receive an alternative current (AC) power $V_{AC}$.

A first terminal of the capacitor C1 is coupled to a first terminal of the secondary side S1 of the transformer T1. The cathode of the first diode D1 is coupled to a second terminal of the capacitor C1. The anode of the first diode D1 is coupled to a reference potential (e.g. a ground potential GND). The anode of the second diode D2 is coupled to the second terminal of the capacitor C1. The cathode of the second diode D2 is coupled to the ground potential GND through a first light emitting diode (LED) string LLB1. The cathode of the third diode D3 is coupled to a second terminal of the secondary side S1 of the transformer T1. The anode of the third diode D3 is coupled to the ground potential GND. The anode of the fourth diode D4 is coupled to the second terminal of the secondary side S1 of the transformer T1. The cathode of the fourth diode D4 is coupled to the ground potential GND through a second LED string LLB2.

Figure 2:
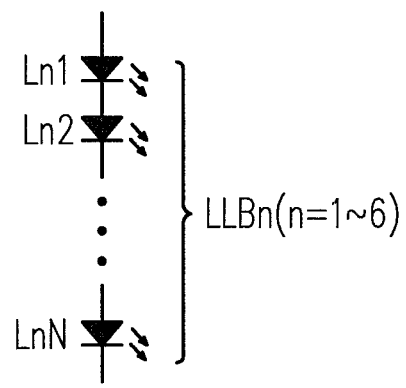
FIG. 2 illustrates the LED string of one embodiment of the present invention.

As shown in FIG. 2, in the present first embodiment, the first LED string LLB1 includes a plurality of LEDs L11-L1N connected in series. The anode of the first LED string LLB1 is coupled to the cathode of the second diode D2, and the cathode of the first LED string LLB1 is coupled to the ground potential GND. In addition, the second LED string LLB2 includes a plurality of second LEDs L21-L2N connected in series. The anode of the second LED string LLB2 is coupled to the cathode of a fourth diode D4, and the cathode of the second LED string LLB2 is coupled to the ground potential GND.

With the circuit constructed as described above, during the positive half cycle of the AC power $V_{AC}$ (+), the first LED string LLB1 emits light, and the current I_LLB1 flowing through the first LED string LLB1 would travel through the third diode D3, the secondary side S1 of the transformer T1, the capacitor C1, the second diode D2 and the first LED string LLB1 (i.e. D3→S1→C1→D2→LLB1). On the other hand, during the negative half cycle of the AC power $V_{AC}$ (−), the second LED string LLB2 emits light, and the current I_LLB2 flowing through the second LED string LLB2 would travel through the first diode D1, the capacitor C1, the secondary side S1 of the transformer T1, the fourth diode D4 and the second LED string LLB2 (i.e. D1→C1→S1→D4→LB2).

As can be seen from the above description, the LED strings LLBn (n=1, 2) have almost the same load characteristics during the positive and negative (+ and −) half cycles of the AC power $V_{AC}$. As such, the currents LLLBn (n=1, 2) flowing through the LED strings LLBn (n=1, 2) are basically/substantially equal, thereby achieving the current balance as well as the equal luminance of the LED strings LLBn (n=1, 2).

Figure 3:
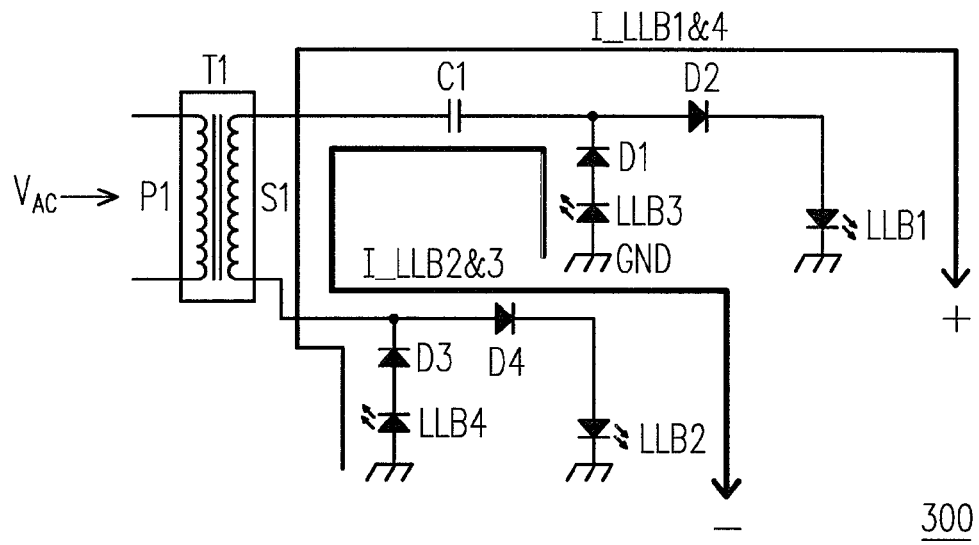
FIG. 3 illustrates a circuit of a passive current balance driving apparatus according to a second embodiment of the present embodiment.

FIG. 3 illustrates a circuit of a passive current balance driving apparatus 300 according to a second embodiment of the present embodiment. Referring to FIGS. 1 and 3, the differences between the passive current balance driving apparatus 200 and 300 lie in that the anode of the first diode D1 of the passive current balance driving apparatus 300 is coupled to the ground potential GND through a third LED string LLB3, and the third diode D3 of the passive current balance driving apparatus 300 is coupled to the ground potential GND through a fourth LED string LLB4.

In the second embodiment, as shown in FIG. 2, the third LED string LLB3 includes a plurality of LEDs L31-L3N connected in series. The cathode of the third LED string LLB3 is coupled to the anode of the first diode D1. The anode of the third LED string LLB3 is coupled to the ground potential GND. In addition, the fourth LED string LLB4 includes a plurality of fourth LEDs L41-L4N connected in series. The cathode of the fourth LED string LLB4 is coupled to the anode of the third diode D3. The anode of the fourth LED string LLB4 is coupled to the ground potential GND.

With the circuit constructed as described above, during the positive half cycle of the AC power $V_{AC}$ (+), the first and fourth LED strings LLB1 and LLB4 emit light, and the current I_LLB1&4 flowing through the first and fourth LED strings LLB1 and LLB4 would travel through the fourth LED string LLB4, the third diode D3, the secondary side S1 of the transformer T1, the capacitor C1, the second diode D2 and the first LED string LLB1 (i.e. LLB4→D3→S1→C1→D2→LLB1). On the other hand, during the negative half cycle of the AC power $V_{AC}$ (−), the second and third LED strings LLB2 and LLB3 emit light, and the current I_LLB2&3 flowing through the second and third LED strings LLB2 and LLB3 would travel through the third LED string LLB3, the first diode D1, the capacitor C1, the secondary side S1 of the transformer T1, the fourth diode D4 and the second LED string LLB2 (i.e. LLB3→D1→C1→S1→D4→LLB2).

As can be seen from the above description, the LED strings LLBn (n=1-4) have almost the same load characteristics during the positive and negative (+ and −) half cycles of the AC power $V_{AC}$. As such, the currents I_LLBn (n=1-4) flowing through the LED strings LLBn (n=1-4) are basically/substantially equal, thereby achieving the current balance as well as the equal luminance of the LED strings LLBn (n=1-4).

Figure 4:
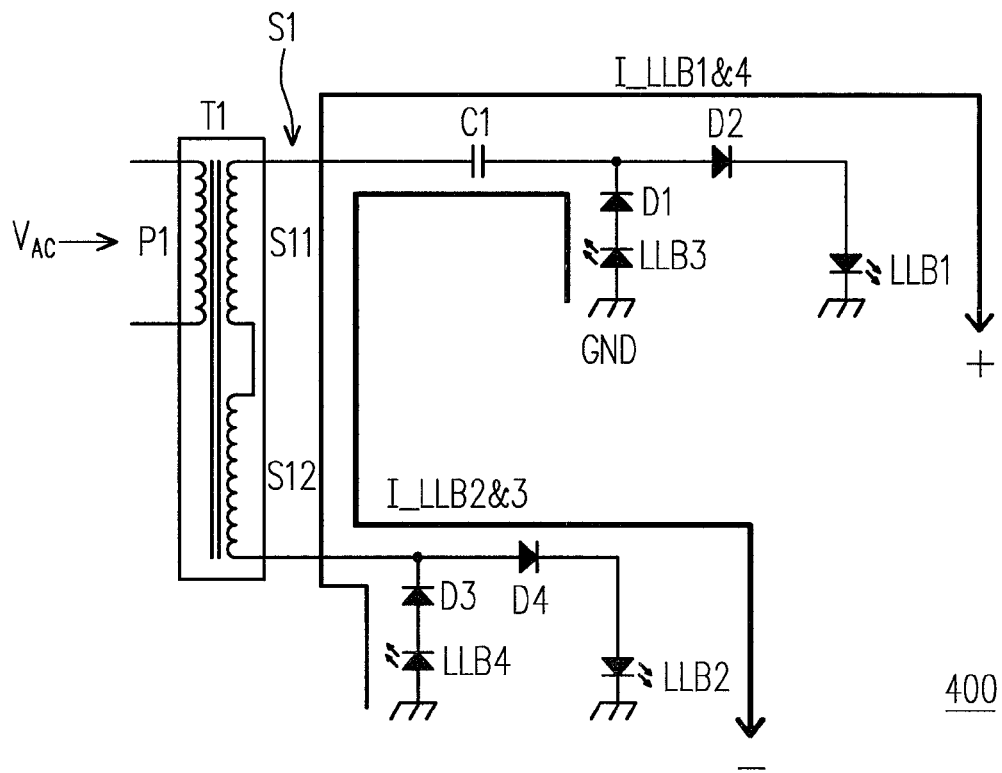
FIG. 4 illustrates a circuit of a passive current balance driving apparatus according to a third embodiment of the present embodiment.

FIG. 4 illustrates a circuit of a passive current balance driving apparatus 400 according to a third embodiment of the present invention. Referring to FIGS. 3 and 4, the differences between the passive current balance driving apparatus 300 and 400 lie in that the secondary side S1 of the transformer T1 of the passive current balance driving apparatus 400 may include a first sub-secondary side S11 and a second sub-secondary side S12. A first terminal of the first sub-secondary side S11 may be served as the first terminal of the secondary side S1. A second terminal of the second sub-secondary side S12 may be served as the second terminal of the secondary side S1. A second terminal of the first sub-secondary side S11 and a first terminal of the second sub-secondary side S12 may be coupled to each other.

With this construction, during the positive half cycle of the AC power $V_{AC}$ (+), the first and fourth LED strings LLB1 and LLB4 emit light, and the current I_LLB1&4 flowing through the first and fourth LED strings LLB1 and LLB4 would travel through the fourth LED string LLB4, the third diode D3, the second sub-secondary side S12, the first sub-secondary side S11, the capacitor C1, the second diode D2 and the first LED string LLB1 (i.e. LLB4→D3→S12→S11→C1→D2→LLB1). On the other hand, during the negative half cycle of the AC power $V_{AC}$ (−), the second and third LED strings LLB2 and LLB3 emit light, and the current I_LLB2&3 flowing through the second and third LED strings LLB2 and LLB3 would travel through the third LED string LLB3, the first diode D1, the capacitor C1, the first sub-secondary side S11, the second sub-secondary S12, the fourth diode D4 and the second LED string LLB2 (i.e. LLB3→D1→C1→S11→S12→D4→LLB2).

As can be seen from the above description, the LED strings LLBn (n=1-4) have almost the same load characteristics during the positive and negative (+ and −) half cycles of the AC power $V_{AC}$. As such, the currents I_LLBn (n=1-4) flowing through the LED strings LLBn (n=1-4) are basically/substantially equal, thereby achieving the current balance as well as the equal luminance of the LED strings LLBn (n=1-4).

Figure 5:
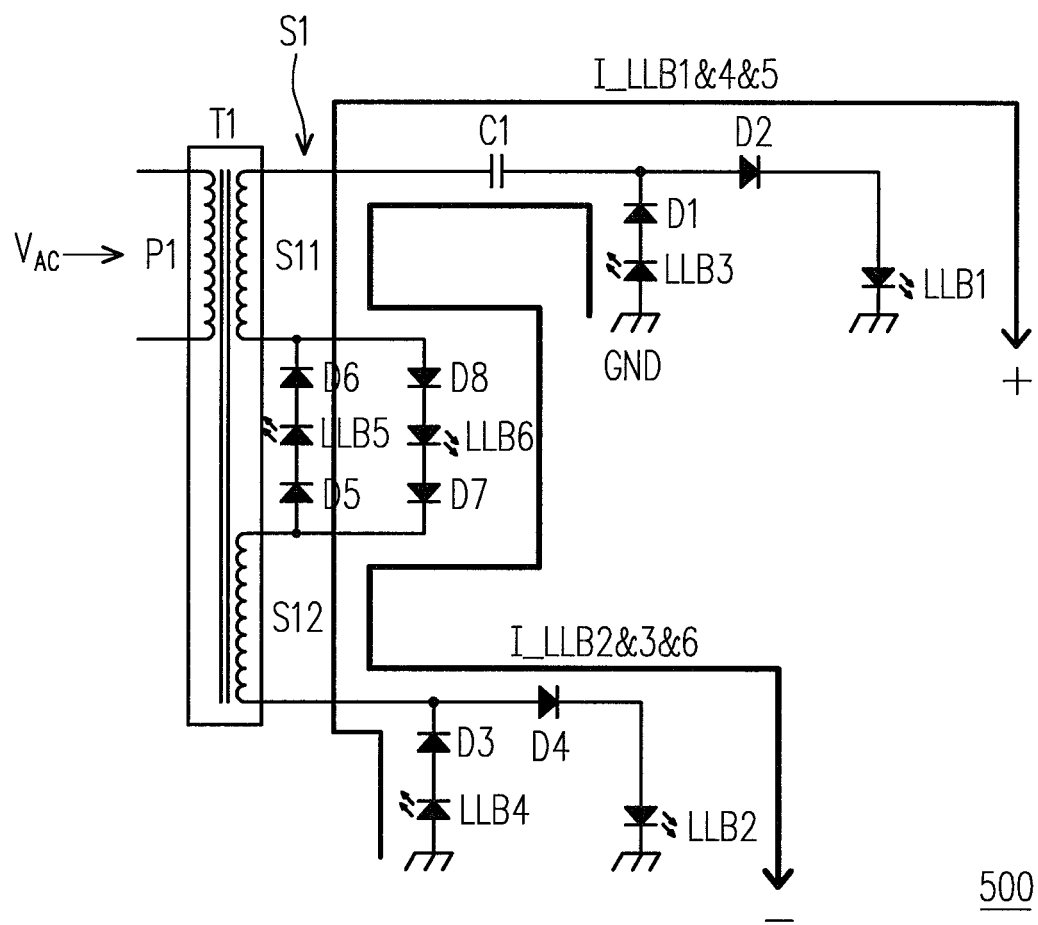
FIG. 5 illustrates a circuit of a passive current balance driving apparatus according to a fourth embodiment of the present embodiment.

FIG. 5 illustrates a circuit of a passive current balance driving apparatus 500 according to a fourth embodiment of the present invention. Referring to FIGS. 4 and 5, the differences between the passive current balance driving apparatus 400 and 500 lie in that the second terminal of the first sub-secondary side S11 and the first terminal of the second sub-secondary side S12 of the transformer T1 of the passive current balance driving apparatus 500 are not coupled to each other, and there are additional fifth to eighth diodes D5-D8.

In this fourth embodiment, the anode of the fifth diode D5 is coupled to the first terminal of the second sub-secondary side S12. The anode of the sixth diode D6 is coupled to the cathode of the fifth diode D5 through a fifth LED string LLB5. The cathode of the sixth diode D6 is coupled to the second terminal of the first sub-secondary side S11. The cathode of the seventh diode D7 is coupled to the first terminal of the second sub-secondary side S12. The anode of the eighth diode D8 is coupled to the second terminal of the first sub-secondary side S11, and the cathode of the eighth diode D8 is coupled to the anode of the seventh diode D7 through a sixth LED string LLB6.

Similarly, as shown in FIG. 2, the fifth LED string LLB5 includes a plurality of fifth LEDs L51-L5N connected in series. The anode of the fifth LED string LLB5 is coupled to the cathode of the fifth diode D5. The cathode of the fifth LED string LLB5 is coupled to the anode of the sixth diode D6. In addition, the sixth LED string LLB6 includes a plurality of sixth LEDs L61-L6N connected in series. The anode of the sixth LED string LLB6 is coupled to the cathode of the eighth diode D8. The cathode of the sixth LED string LLB6 is coupled to the anode of the seventh diode D7.

With this construction, during the positive half cycle of the AC power $V_{AC}$ (+), the first, fourth and fifth LED strings LLB1, LLB4 and LLB5 emit light, and the current I_LLB1&4&5 flowing through the first, fourth and fifth LED strings LLB1, LLB4 and LLB5 would travel through the fourth LED string LLB4, the third diode D3, the second sub-secondary side S12, the fifth diode D5, the fifth LED string LLB5, the sixth diode D6, the first sub-secondary side S11, the capacitor C1, the second diode D2 and the first LED string LLB1 (i.e. LLB4→D3→S12→D5→LLB5→D6→S11→C1→D2→LLB1).

On the other hand, during the negative half cycle of the AC power $V_{AC}$ (−), the second, third and sixth LED strings LLB2, LLB3 and LLB6 emit light, and the current I_LLB2&3&6 flowing through the second, third and sixth LED strings LLB2, LLB3 and LLB6 would travel through the third LED string LLB3, the first diode D1, the capacitor C1, the first sub-secondary side S11, the eighth diode D8, the sixth LED string LLB6, the seventh diode D7, the second sub-secondary S12, the fourth diode D4 and the second LED string LLB2 (i.e. LLB3→D1→C1→S11→D8→LLB6→D7→S12→D4→LLB2).

As can be seen from the above description, the LED strings LLBn (n=1-6) have almost the same load characteristics during the positive and negative (+ and −) half cycles of the AC power $V_{AC}$. As such, the currents I_LLBn (n=1-6) flowing through the LED strings LLBn (n=1-6) are basically/substantially equal, thereby achieving the current balance as well as the equal luminance of the LED strings LLBn (n=1-6).

Figure 6:
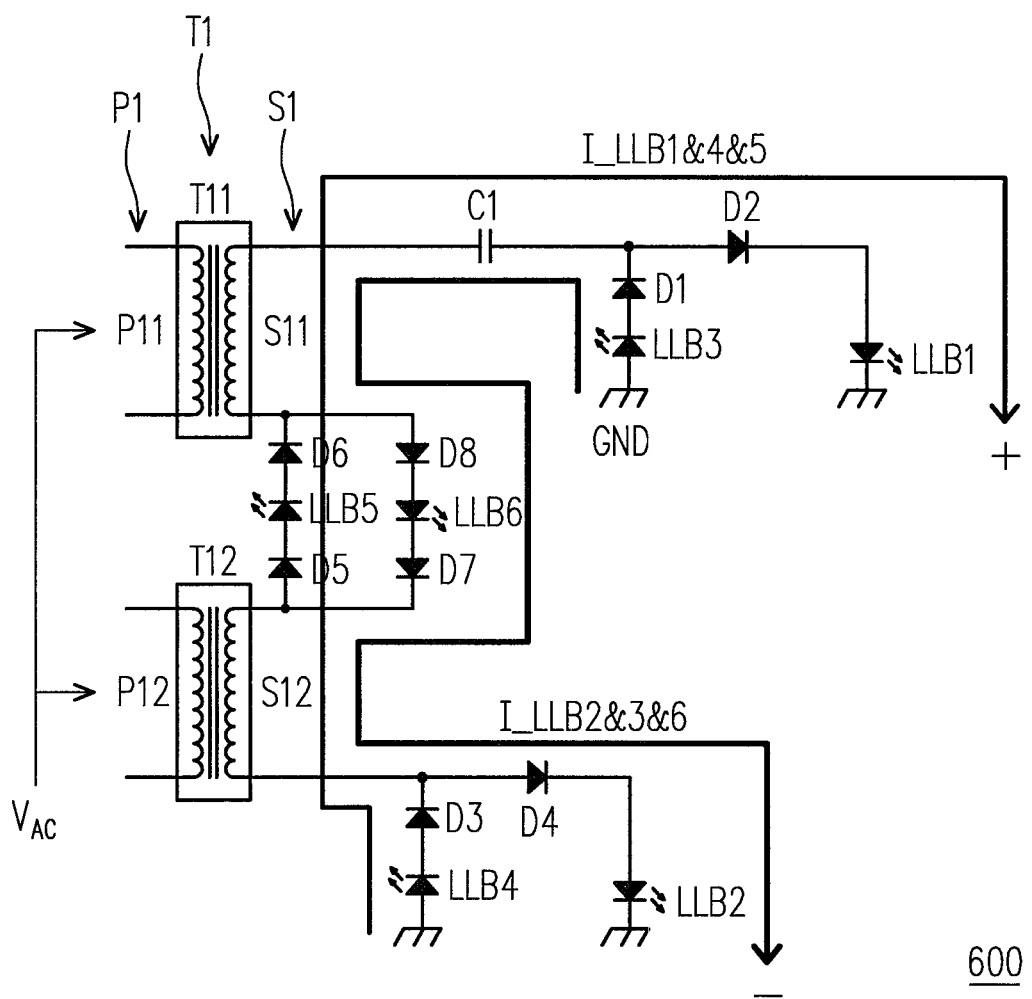
FIG. 6 illustrates a circuit of a passive current balance driving apparatus according to a fifth embodiment of the present embodiment.

FIG. 6 illustrates a circuit of a passive current balance driving apparatus 600 according to a fifth embodiment of the present invention. Referring to FIGS. 5 and 6, the differences between the passive current balance driving apparatus 500 and 600 lie in that the first secondary side P1 of the transformer T1 of the passive current balance driving apparatus 600 may include a first sub-primary side P11 and a second sub-primary side P12. The first sub-primary side P11 and the first sub-secondary side S11 may be constituted as a first sub-transformer T11 (may be considered as an independent transformer) of the transformer T1. The second sub-primary side P12 and the second sub-secondary side S12 may be constituted as a second sub-transformer T12 (may be considered as an independent transformer) of the transformer T1. The first and second sub-primary sides P11 and P12 may be used to receive the AC power $V_{AC}$, respectively. With the construction, the operation of the passive balance current driving apparatus 600 during the positive and negative half cycles (+ and −) of the AC power $V_{AC}$ is similar to the operation of the passive balance current driving apparatus 500 and therefore explanation thereof is not repeated herein.

It should be noted that the passive current balance driving apparatus of the present invention can be enabled to drive more than six (e.g. eight) LED strings simultaneously simply by dividing the second sub-secondary side (S12) of the fourth or fifth embodiment further into two sub-secondary sides (e.g. third and fourth sub-secondary sides), disposing elements (as disposed between the first and second sub-secondary sides (S11 and S12), i.e. D5-D7, LLB5, and LLB6) between the second and third sub-secondary sides, and coupling the fourth sub-secondary side to those elements that were previously coupled to the second sub-secondary side (i.e. D3, D4, LLB2, and LLB4). As such, the passive current balance driving apparatus can drive eight LED strings simultaneously.

In addition, to enable the passive current balance driving apparatus of the present invention to drive more than eight (e.g. 10, 12, 14, 16, or the like number with is incremented by two each time) LED strings, the passive current balance driving apparatus can be constructed on the analogy of the construction of simultaneously driving eight LED strings as described above and therefore explanation thereof is not repeated herein.

For application of the passive current balance driving apparatus, when the passive current balance driving apparatus of the above embodiments is used to drive a plurality of LED strings arranged in parallel of an LED backlight module of an LED display, it can achieve the equal current flowing through each of the LED strings, such that the light source provided to the LED panel by the LED backlight module can have a more uniform luminance.

It should be noted that it is not intended to limit the application of the passive current balance driving apparatus of the above embodiments to driving each of the LED strings of the LED backlight module of the LED display. In other words, the passive current balance driving apparatus of the above embodiments can be equally used to balance current where a plurality of LED strings are driven simultaneously (e.g. large LED billboard).

Besides, the passive current balance driving apparatus of the above embodiments can be constructed by simply several simply passive components. Therefore, the fabrication cost of the present passive current balance driving apparatus is far less than that of the conventional current balance control circuit formed by multiple MOSFETs or the current regulation chip (i.e. current sink IC).

In summary, the present passive current balance driving apparatus is mainly configured such that each LED string has the identical load characteristics during the positive and negative half cycles of the AC power. As such, the currents flowing through the respective LED strings are basically/substantially equal, thereby achieving the current balance.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A passive current balance driving apparatus comprising:
   a transformer having a primary side and a secondary side, wherein the primary side is adapted to receive an alternative current (AC) power, the secondary side comprises a first sub-secondary side and a second sub-secondary side, and a second terminal of the first sub-secondary side and a first terminal of the second sub-secondary side are coupled to each other;
   a capacitor, wherein a first terminal of the capacitor is coupled to a first terminal of the secondary side;
   a first diode, wherein a cathode of the first diode is coupled to a second terminal of the capacitor, and an anode of the first diode is coupled to a reference potential;
   a second diode, wherein an anode of the second diode is coupled to the second terminal of the capacitor, and a cathode of the second diode is coupled to the reference potential through a first light emitting diode (LED) string;
   a third diode, wherein a cathode of the third diode is coupled to a second terminal of the secondary side, and the anode of the third diode is coupled to the reference potential; and
   a fourth diode, wherein an anode of the fourth diode is coupled to the second terminal of the secondary side, and a cathode of the fourth diode is coupled to the reference potential through a second LED string,
   wherein the anode of the first diode is further coupled to the reference potential through a third LED string, and the anode of the third diode is further coupled to the reference potential through a fourth LED string,
   wherein a first current is generated during a positive half cycle of the AC power to flow through the first and the fourth LED strings, and then only the LED strings that the first current flows through emit light, wherein a second current is generated during a negative half cycle of the AC power to flow through the second and the third LED strings, and then only the LED strings that the second current flows through emit light,
   wherein the first current is substantially equal to the second current, such that brightness of the first through the fourth LED strings are identical.

2. The passive current balance driving apparatus according to claim 1, wherein
   the first LED string comprises a plurality of first LEDs connected in series, an anode of the first LED string is coupled to the cathode of the second diode, and a cathode of the first LED string is coupled to the reference potential;
   the second LED string comprises a plurality of second LEDs connected in series, an anode of the second LED string is coupled to the cathode of the fourth diode, and a cathode of the second LED string is coupled to the reference potential;
   the third LED string comprises a plurality of third LEDs connected in series, a cathode of the third LED string is coupled to the anode of the first diode, and an anode of the third LED string is coupled to the reference potential; and the fourth LED string comprises a plurality of fourth LEDs connected in series, a cathode of the fourth LED string is coupled to the anode of the third diode, and an anode of the fourth LED string is coupled to the reference potential.

3. The passive current balance driving apparatus according to claim 2, wherein a first terminal of the first sub-secondary side serves as the first terminal of the secondary side, and a second terminal of the second sub-secondary side serves as the second terminal of the secondary side.

4. The passive current balance driving apparatus according to claim 3, further comprising:
   a fifth diode, wherein an anode of the fifth diode is coupled to a first terminal of the second sub-secondary side;
   a sixth diode, wherein an anode of the sixth diode is coupled to a cathode of the fifth diode through a fifth LED string, and a cathode of the sixth diode is coupled to a second terminal of the first sub-secondary side;
   a seventh diode, wherein a cathode of the seventh diode is coupled to the first terminal of the second sub-secondary side; and
   an eighth diode, wherein an anode of the eighth diode is coupled to the second terminal of the first sub-secondary side, and a cathode of the eighth diode is coupled to an anode of the seventh diode through a sixth LED string.

5. The passive current balance driving apparatus according to claim 4, wherein
   the fifth LED string comprises a plurality of fifth LEDs connected in series, an anode of the fifth LED string is coupled to the cathode of the fifth diode, and a cathode of the fifth LED string is coupled to the anode of the sixth diode; and
   the sixth LED string comprises a plurality of sixth LEDs connected in series, an anode of the sixth LED string is coupled to the cathode of the eighth diode, and a cathode of the sixth LED string is coupled to the anode of the seventh diode.

6. The passive current balance driving apparatus according to claim 5, wherein the primary side comprises a first sub-primary side and a second sub-primary side, the first sub-primary side and the first sub-secondary side are to be formed as a first sub-transformer of the transformer, and the second sub-primary side and the second sub-secondary side are to be formed as a second sub-transformer of the transformer.

7. The passive current balance driving apparatus according to claim 6, wherein the first sub-primary side and the second sub-primary side are adapted to receive the AC power, respectively.

8. A passive current balance driving apparatus comprising:
   a transformer having a primary side and a secondary side, wherein the primary side is adapted to receive an alternative current (AC) power;
   a capacitor, wherein a first terminal of the capacitor is coupled to a first terminal of the secondary side;
   a first diode, wherein a cathode of the first diode is coupled to a second terminal of the capacitor, and an anode of the first diode is coupled to a reference potential;
   a second diode, wherein an anode of the second diode is coupled to the second terminal of the capacitor, and a cathode of the second diode is coupled to the reference potential through a first light emitting diode (LED) string;
   a third diode, wherein a cathode of the third diode is coupled to a second terminal of the secondary side, and the anode of the third diode is coupled to the reference potential; and
   a fourth diode, wherein an anode of the fourth diode is coupled to the second terminal of the secondary side, and a cathode of the fourth diode is coupled to the reference potential through a second LED string,
   wherein a first current is generated during a positive half cycle of the AC power to flow through the first LED string, and then only the LED string that the first current flows through emits light,
   wherein a second current is generated during a negative half cycle of the AC power to flow through the second LED string, and then only the LED string that the second current flows through emits light,
   wherein the first current is substantially equal to the second current, such that brightness of the first through the second LED strings are identical.

* * * * *